United States Patent
Ikeda et al.

(10) Patent No.: US 6,808,007 B2
(45) Date of Patent: Oct. 26, 2004

(54) DIE OPENING/CLOSING APPARATUS FOR DIE-CASTING SYSTEMS AND MACHINES AND METHODS FOR OPENING DIES USING SUCH DIE OPENING/CLOSING APPARATUS

(75) Inventors: Tomoaki Ikeda, Kariya (JP); Koichi Kawaura, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 0 days.

(21) Appl. No.: 10/244,305

(22) Filed: Sep. 16, 2002

(65) Prior Publication Data

US 2003/0051853 A1 Mar. 20, 2003

(30) Foreign Application Priority Data

Sep. 17, 2001 (JP) .................................... 2001-281784

(51) Int. Cl.[7] .................................................. B22D 33/04
(52) U.S. Cl. ...................... 164/137; 164/121; 164/341; 164/342
(58) Field of Search ................................ 164/121, 137, 164/168, 312–318, 339–343

(56) References Cited

U.S. PATENT DOCUMENTS

| | | | | |
|---|---|---|---|---|
| 2,410,909 A | * | 11/1946 | Tucker | 425/146 |
| 2,555,476 A | * | 6/1951 | Du Bois et al. | 425/589 |
| 3,543,835 A | * | 12/1970 | Perkon | 164/339 |
| 3,803,842 A | * | 4/1974 | Aoki | 60/416 |
| 4,174,199 A | * | 11/1979 | Benninghaus | 425/195 |

FOREIGN PATENT DOCUMENTS

JP 07186219 A 7/1995

* cited by examiner

Primary Examiner—Kiley Stoner
Assistant Examiner—Len Tran
(74) Attorney, Agent, or Firm—Knoble Yoshida & Dunleavy

(57) ABSTRACT

Die opening apparatus (50) of a die-casting system (10) is operable to open a die (D1, D2). A first cylinder (51) may perform an initial die opening operation and a second cylinder (55) may perform a subsequent die opening operation. The thrust generated by the first cylinder is preferably directly transmitted to the die in a die opening direction, optionally via a push pin (52).

20 Claims, 4 Drawing Sheets

DIE OPENING/CLOSING APPARATUS FOR DIE-CASTING SYSTEMS AND MACHINES AND METHODS FOR OPENING DIES USING SUCH DIE OPENING/CLOSING APPARATUS

This application claims priority to Japanese patent application serial number 2001-281784, the contents of which are incorporated herein by reference.

BACKGROUND OF THE INVENTION

1. Technical Field

The present invention relates to die-casting systems and machines that include dies into which molten materials are injected in order to form cast products. In particular, the present invention relates to techniques for opening dies in order to remove cast products from the dies.

2. Description of the Related Art

Apparatus for opening dies after completing a casting process are known. For example, Japanese Laid-Open Patent Publication No. 7-186219 teaches a die-opening apparatus for a die-casting machine. The die-opening apparatus includes a first cylinder and a second cylinder. The first cylinder performs an initial die-opening step. The initial die-opening step requires a relatively high load (great force), but does not require a substantial stroke length. The second cylinder performs a subsequent die-opening step that requires a relatively low load (reduced force) and a relatively long stroke length.

However, in order to enable the first cylinder to extend or project under a high load over a relatively short stroke length, the power of the first cylinder is transmitted to a movable die part via a motion conversion mechanism that is configured as a rack and pinion mechanism. Consequently, the construction of the known die-opening apparatus is rather complicated, which has been a problem of the known die-opening apparatus.

SUMMARY OF THE INVENTION

Therefore, it is one object of the present invention to teach improved die-opening apparatus for die-casting systems and machines and to simplify the construction thereof.

According to one aspect of the present teachings, apparatus for opening dies in die-casting systems and machines (hereinafter "die-opening apparatus") are taught that may include a first cylinder and a second cylinder. The first cylinder may serve to initially open the die. The second cylinder may serve to subsequent open the die after the first cylinder has initially opened the die. The thrust generated by the first cylinder (i.e., the movement of the first cylinder when the first cylinder extends or projects and generates an extending thrust or force) may be directly transmitted to the die in the opening direction of the die so as to open the die.

As a result, the thrust (extending force) generated by the first cylinder can be transmitted or applied to the die without changing the direction of the force. Therefore, the present die-opening apparatus do not require a motion conversion mechanism for converting the direction of the force (thrust) of the first cylinder or for converting the movement (linear extension) of the first cylinder into another type of movement, such as rotation. Therefore, the construction of the present die-opening apparatus is simplified as compared to known die-opening apparatus.

According to another aspect of the present teachings, the first cylinder may be made separately from the die. Therefore, the die may have a simple construction and may be relatively lightweight. Optionally, the first cylinder may be mounted on a movable base that can move or slide relative to a die-casting unit.

According to another aspect of the present teachings, the die may include a first die part that can move relative to a second die part. The thrust generated by the first cylinder may be transmitted or applied to the first die part. Optionally, the first cylinder may transmit the thrust to the first die part via a push pin. The push pin may preferably be slidably inserted into a thorough-hole defined within the second die part. The push pin may be normally held in position by a spring, so as not to contact the first die part when the first cylinder is not being actuated.

According to another aspect of the present teachings, methods for opening a die using a first cylinder and a second cylinder are taught. The first cylinder may serve to perform an initial die opening operation. The second cylinder may serve to perform a subsequent die opening operation. The thrust generated by the first cylinder may be directly transmitted to the die in a die opening direction preferably without converting the thrust (force) into another type of force or into another type of movement.

Additional objects, features and advantages of the present invention will be readily understood after reading the following detailed description together with the claims and the accompanying drawings.

DETAILED DESCRIPTION OF THE INVENTION

Figure 1:
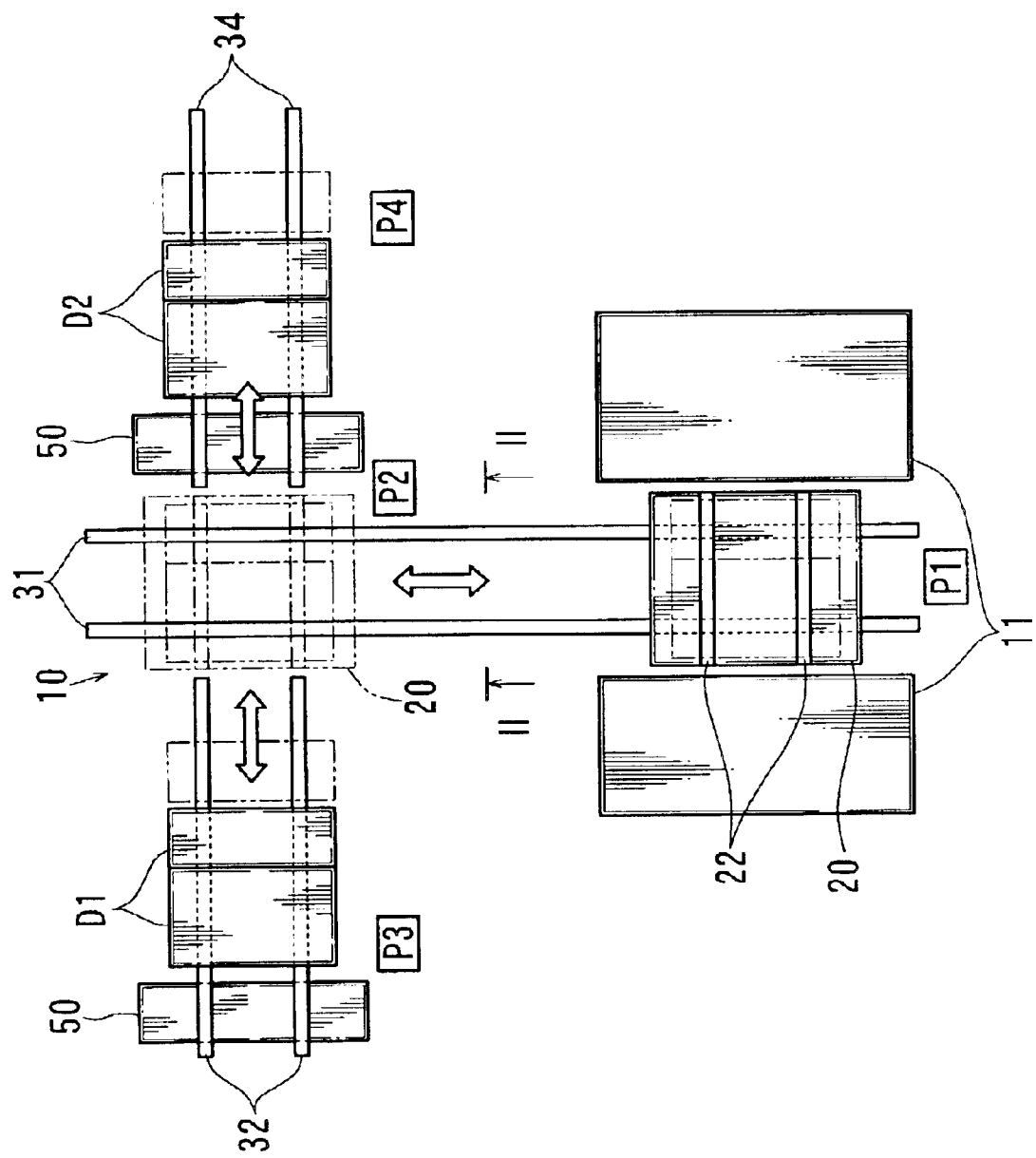
FIG. 1 is a schematic plan view of a die-casting system incorporating a representative die opening/closing apparatus.

In one embodiment of the present teachings, die-opening apparatus for opening dies in die-casting systems and machines are taught. At least one die-opening apparatus may be provided for each respective die-casting system and machine. The die-opening apparatus may include a first cylinder and a second cylinder. The first cylinder may be utilized to perform an initial opening operation for the die. Preferably, the first cylinder may be a high-pressure and short-stroke cylinder. The second cylinder may be utilized to perform a subsequent opening operation for the die after the first cylinder has performed the initial opening operation. In the alternative, the second cylinder may be actuated while the first cylinder is performing the initial die opening operation. Preferably, the second cylinder may be a low-pressure and long-stroke cylinder. The thrust generated by the first cylinder preferably is directly transmitted to the die in a die opening direction so as to open the die.

Because the thrust of the first cylinder may be transmitted to the die without changing the direction of force, the die-opening apparatus according to the present teachings do not require any motion conversion mechanism. In addition, the die-opening apparatus may be simplified with regard to the construction for the initial die opening operation. The required force (thrust) for the initial die opening operation may be attained by appropriately selecting the diameter of the first cylinder.

In another embodiment of the present teachings, the die-opening apparatus may further include a die-casting unit for performing a casting operation. The die opening operation may be performed after the die that has been conveyed (moved) from the die-casting unit to a removed (carry out) position.

Therefore, the die-opening apparatus can be advantageously utilized with die-casting systems, in which, e.g., a plurality of dies are alternatively carried (transferred) into and out of a die-casting unit in order to perform a die-casting operation. Optionally, the die may be opened in the horizontal direction. This arrangement is advantageous because, in such die-casting systems, the die may be conveyed (moved) in the horizontal direction. Therefore, the die opening operation can be efficiently performed.

In another embodiment of the present teachings, the first cylinder may include a rest position, in which the first cylinder does not contact the die. After completion of the casting operation, the die may be carried out of (removed from) the die-casting unit and then may be opened by the first cylinder. Therefore, the first cylinder may be configured as a separate member from the die. As a result, the die may have a small size and lightweight. In addition, the die can be easily conveyed (moved). Optionally, the first cylinder may be mounted on a movable base.

In another embodiment of the present teachings, the thrust generated by the first cylinder may be directly transmitted to the die in the extensional (e.g., horizontal) direction via an assistant member. For example, the assistant member may comprise a push pin that is slidably disposed within the die. Therefore, the thrust generated by the first cylinder may be transmitted to the die in the extensional direction via the push pin so as to open the die.

In another embodiment of the present teachings, the second cylinder may apply pressure to the die in the opening direction during the initial die opening operation, which is performed by the first cylinder. Therefore, the die may be opened a relatively large distance by using the second cylinder, which may be a low-pressure and long stroke cylinder. In addition, the subsequent die opening operation can be smoothly performed subsequent to the initial die opening operation, because the subsequent die opening operation is initiated before the initial die opening operation is completed.

In another embodiment of the present teachings, methods for opening dies using a first cylinder and a second cylinder are taught. The first cylinder may be actuated to perform an initial die opening operation and the second cylinder may be actuated to perform a subsequent die opening operation. The thrust generated by the first cylinder preferably is directly transmitted to the die in the die opening direction.

Each of the additional features and teachings disclosed above and below may be utilized separately or in conjunction with other features and teachings to provide improved die-opening apparatus and methods for designing and using such die-opening apparatus. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A die-casting system 10 incorporating a representative die opening/closing apparatus 50 will now be described with reference to FIGS. 1 and 2, which respectively show a schematic plan view of the die-casting system 10 and a cross-sectional view taken along line II—II in FIG. 1.

Referring to FIG. 1, the die-casting system 10 may be configured as a die-change type system, in which two dies D1 and D2 are exchangeably carried (moved) into and out of a single die-casting unit 11 in order to form die-cast products. The die-casting unit 11 may be configured to clamp and close the dies D1 and D2 and also to inject molten (or liquefied) materials (e.g., metal and/or resin materials) into the dies D1 and D2. In addition to the die-casting unit 11, the die-casting system 10 may include a single carriage 20 for carrying (moving) the dies D1 and D2 into and out of the die-casting unit 11. Further, a pair of carriage rails 31 may be provided in order to movably support the carriage 20, and two pairs of die rails 32 and 34 may be provided for transferring (movably supporting) the dies D1 and D2. Moreover, two die opening/closing apparatus 50 may be arranged and constructed to open the dies D1 and D2, which dies may be carried (moved) along the rails 32 and 34, respectively, after the casting operation has been completed.

After the die D1 (or D2) has been transferred or moved to casting position P1, the die-casting unit 11 may clamp the die D1 (or D2) in order to close the die. Then, molten materials may be injected into the die D1 (or D2). In order to perform these operations, the die-casting unit 11 may include a clamping device (not shown) that serves to clamp the dies D1 (or D2) in a horizontal direction by applying pressure against the rear surface of the die. The die-casting unit 11 also may include a molten material injecting device that serves to inject the molten material into the die D1 (or D2) after the die D1 (or D2) has been clamped.

Optionally, the carriage rails 31 and the die rails 32 and 34 may be arranged to form a T-shape in a plan view as shown in FIG. 1. The carriage rails 31 may extend from casting position P1 to carrying-out (removed) position P2 and may serve to provide a moving path for the carriage 20. Either the die D1 or D2 may be loaded onto the carriage 20. In addition, the carriage 20 optionally may be supported on the carriage rails 31 via a pair of sliders 21, as shown in FIG. 2. In this case, the carriage 20 can slidably move in the forward and rearward directions as indicated by an arrow in FIG. 1.

Figure 2:
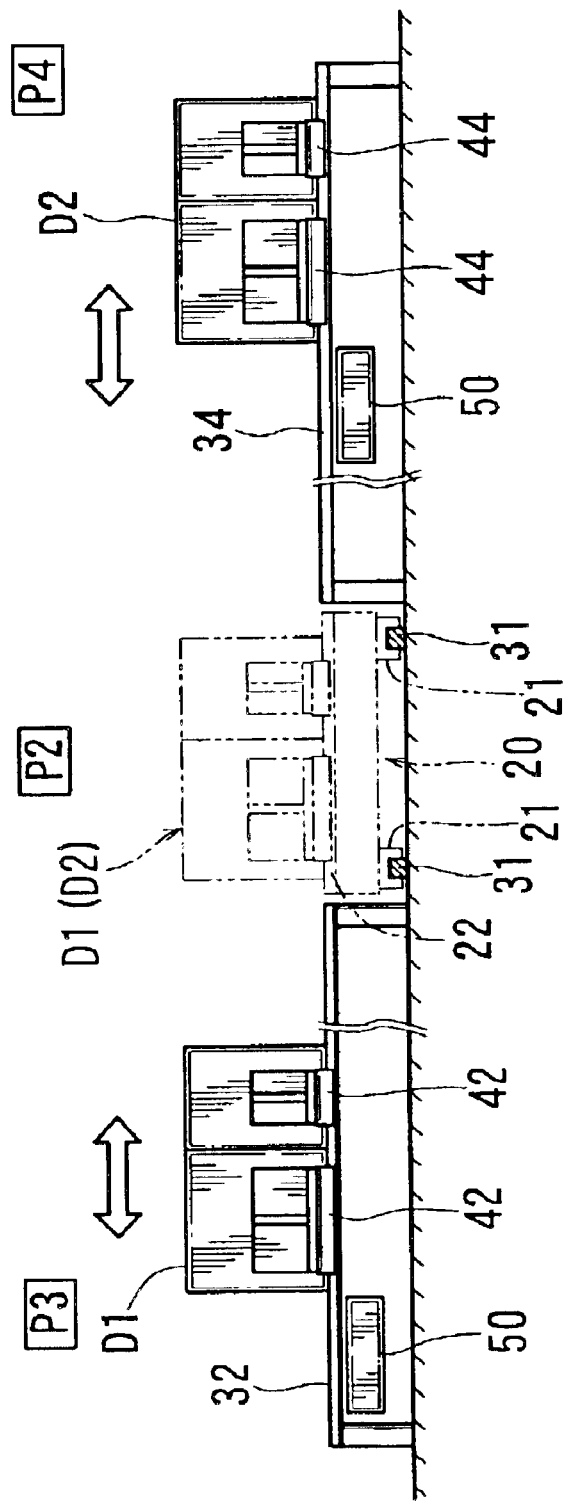
FIG. 2 is a cross-sectional view taken along line II—II in FIG. 1.

Referring to FIGS. 1 and 2, the die rails 32 may extend between carrying-out (removed) position P2 and opening/closing position P3. The die rails 34 may extend between carrying-out (removed) position P2 and opening/closing position P4. Thus, the die rails 32 and 34 may serve to provide branch paths that branch from the carrier rails 31 at carrying-out position P2.

The die carriage 20 may include on-carriage rails 22 that extend substantially perpendicular to the carriage rails 31. The on-carriage rails 22 preferably align with the die rails 32 and 34 when the carriage 20 is positioned at carrying-out position P2. Thus, the on-carriage rails 22 and the die rails 32 and 34 may extend in series along a linear path. Therefore, when the die D1, which includes the cast product, has been moved to carrying-out position P2, the die D1 can smoothly transfer from the on-carriage rails 22 to the die rails 32 with the aid of sliders 42. After transferring the die D1 to the die rails 34, the die D1 may then be opened in the horizontal direction by the corresponding die opening/closing apparatus 50.

Similarly, when the die D2, which includes the cast product, has been moved to carrying-out position P2, the die D2 can also smoothly transfer from the on-carriage rails 22 to the die rails 34 with the aid of sliders 44. The die D2 that has been transferred to the die rails 34 may then be opened in the horizontal direction by the corresponding die opening/closing apparatus 50. Although not shown in the drawings, the die carriage 20 may include a clamping device that can clamp and unclamp the die D1 or D2 against the die carriage 20.

Figure 3:
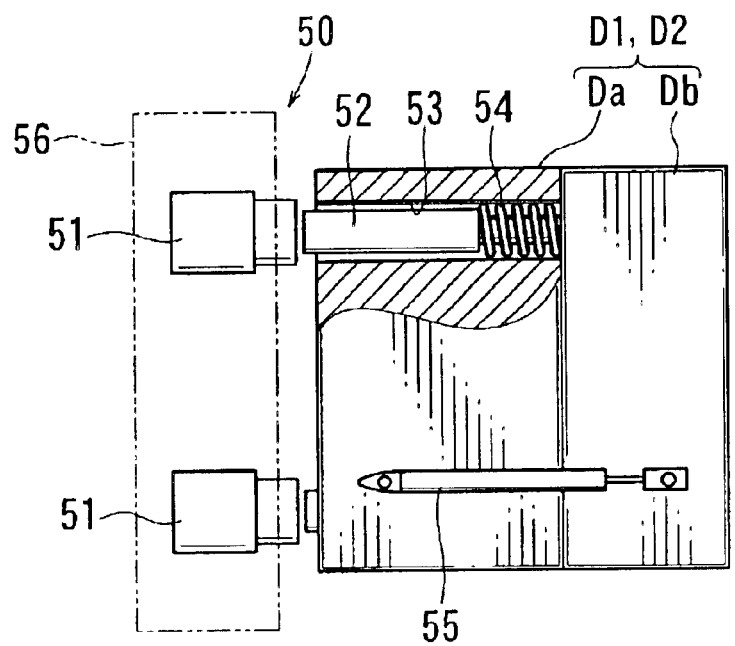
FIG. 3 is a plan view of the die opening/closing apparatus with a die in a closed state.
Figure 4:
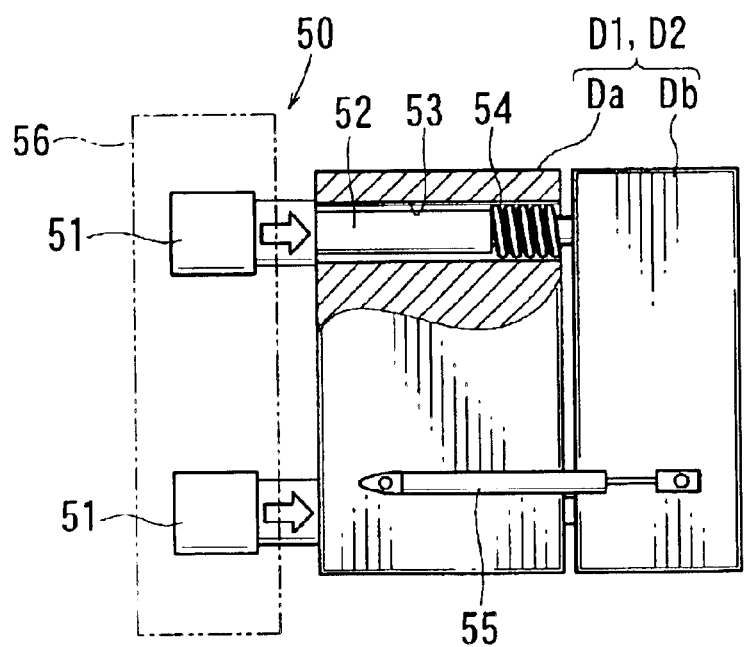
FIG. 4 is a plan view similar to FIG. 3 with the die in an initially opened state.
Figure 5:
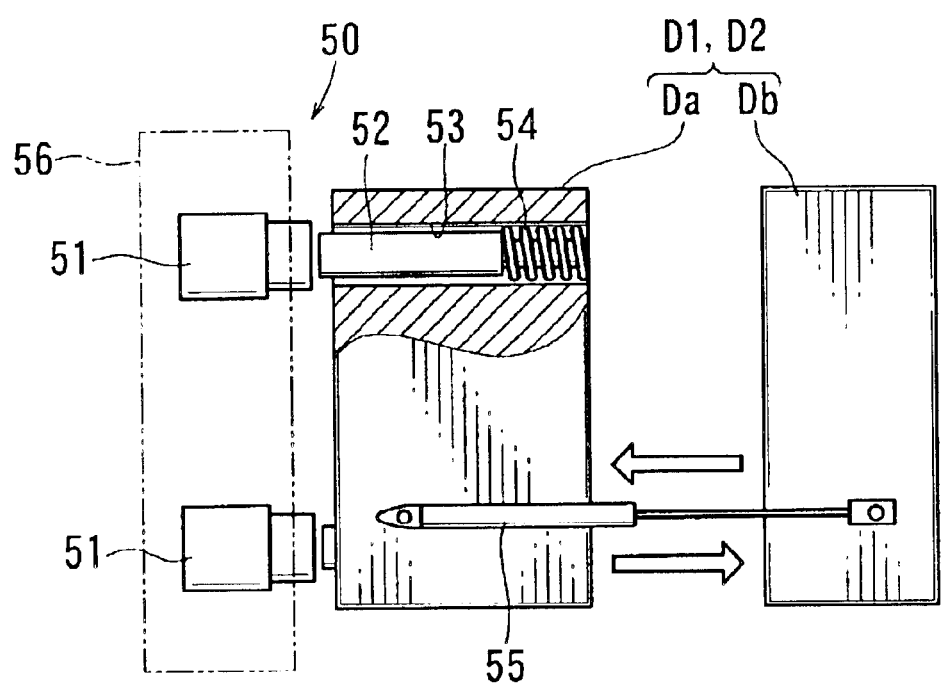
FIG. 5 is a plan view similar to FIG. 3 with the die in a wide-opened state.

The representative die opening/closing apparatus 50 will now be described in further detail with reference to FIGS. 3 to 5. The construction of the die opening/closing apparatus 50 for the die D1 preferably may be the same as the die opening/closing apparatus 50 for the die D2. Therefore, only one of the die opening/closing apparatus 50 will be described.

The die opening/closing apparatus 50 may include one or more high-pressure and short-stroke cylinders (hereinafter called "high-pressure cylinders") 51 and one or more low-pressure and long-stroke cylinders (hereinafter called "low-pressure cylinders") 55. Only one low-pressure cylinder 55 is shown in the drawings for the purpose of illustration. Further, each of the dies D1 and D2 may include a fixed die part Da and a movable die part Db.

The thrust generated by the high-pressure cylinder(s) 51 may be directly transmitted to the movable die part Db in the extensional (e.g., horizontal) direction of the high-pressure cylinders 51 in order to perform the initial die opening operation for the die D1 (or D2). Optionally, the thrust generated by the high-pressure cylinder(s) 51 may be transmitted or applied to the movable die part Db via respective push pins 52 (one push pin 52 is shown in the drawings for the purpose of illustration) or assistant members in order to urge the movable die part Db in the die opening direction. Thus, the thrust generated by the high-pressure cylinder(s) 51 may be transmitted or applied to the movable die part Db without changing the direction of the force. A plurality of through-holes 53 (only one through-hole 53 is shown in the drawings for the purpose of illustration) may be defined within the fixed die part Da and each through-hole 53 may slidably receive one push pin 52. Therefore, when the high-pressure cylinder 51 is actuated and extends or projects, the high-pressure cylinder 51 will contact and push a first end of the push pin 52. In that case, a second end of the push pin 52 will apply a pushing force against a surface of the movable die part Db, which surface opposes to and mates with a surface of the fixed die part Da. As a result, the die D1 (or D2) may be opened a relatively short distance by the high-pressure cylinder 51. A return spring 54 optionally may serve to hold or retain the push pin 52 in a normal, non-contact position. In this case, the second end of the push pin 52 will not contact the surface of the movable die part Db before the high-pressure cylinder 51 is actuated.

The low-pressure cylinders 55 may serve to further separate the movable die part Db from the fixed die part Da by a relatively larger distance either during or subsequent to the initial die opening operation performed by the high-pressure cylinder 51. Each of the low-pressure cylinders 55 may be connected between the fixed die part Da and the movable die part Db and may extend and retract in the horizontal direction in order to open and close the die D1 (or D2).

In the above representative die opening/closing apparatus 50, the high-pressure cylinders 51 are configured as separate elements from the die D1 and D2. More specifically, the die opening/closing apparatus 50 may include (or may be mounted on) a movable base 56 (indicated by dotted lines in FIGS. 3 to 5) that can move in a direction parallel to the die rails 32 and 34. For example, the high-pressure cylinders 51 may be fixedly mounted on the movable base 56. A drive mechanism, such as a ball screw mechanism (not shown), may be associated with the movable base 56 in order to move the movable base 56 and the high-pressure cylinders 51. In addition, the die opening/closing apparatus 50 may include a clamping device (not shown) that is operable to clamp and unclamp the die D1 (or D2) against the movable base 56. Thus, the clamping device may clamp the die D1 (or D2) in order to transfer the die D1 (or D2) from carrying-out position P2 to opening/closing position P3 (or P4) or vice versa. Naturally, the clamping device may unclamp the die D1 (or D2) when the die D1 (or D2) will be moved from carrying-out position P2 to casting position P1.

A representative method for operating the above die-casting system 10 will now be described. For example, the die-casting operation may be performed by alternately carrying (moving) the dies D1 and D2 into and out of the die-casting unit 11. When the die D1 (or D2) has been brought to casting position P1, molten material may be injected into a cavity (not shown) defined within the die D1 (or D2). The die D2 may have the same design as the die D1 or may have a different design from the die D1. In addition, the die-casting operation also may be performed using only one of the dies D1 and D2.

For example, after the casting operation has been completed for the die D1, the die D1 may be transferred or moved to carrying-out position P2 via the carriage 20. The die D1 may then be clamped by the clamping device of the corresponding die opening/closing apparatus 50 against the movable base 56. Thereafter, the die D1 may be transferred via the on-carriage rails 22 of the die carriage 20 to the die rails 32 so as to be further moved toward opening/closing position P3. During or after such movement of the die D1 from the carrying-out position P2 to the opening position P3, the die D1 may be opened in the horizontal direction, i.e., in the same direction as the moving direction of the die D1. A representative opening operation of the die D1 will be further described below. After the die D1 has been opened, the cast product may be removed from the die D1. Then, a die releasing agent may be applied to the cavity surface of the die D1, and thereafter, the die D1 may be closed.

On the other hand, the die D2 is in a rest position, e.g., the opening/closing position P4, and may be transferred from the rest position to carrying-out position P2 along the die rails 34 by the die opening/closing apparatus 50. The die D2 may then be loaded onto the on-carriage rails 22 and exchanged for the die D1. Thereafter, the die D2 may be transferred to casting position P1 via the die carriage 20 and the molten material may be injected into the die D2 by the die-casting unit 11. The die D2 with the cast product may then be carried out of (moved from) casting position P1 in the same manner as described above in connection with the die D1. The die D2 may then be exchanged with the die D1, which has been closed for the subsequent casting operation.

As a result, the die-casting operation may be performed by alternatively using the dies D1 and D2.

A representative die opening operation that may be performed by the representative die opening/closing apparatus 50 will now be described. When the die D1 (or D2) is closed as shown in FIG. 3, the high-pressure cylinders 51 may be actuated so as to extend or project and thus push the movable die part Db via the respective push pins 52 that extend through the fixed die part Da (see FIG. 4). As a result, the die D1 can be opened. Thus, the high-pressure cylinders 51 may apply a relatively high load (great force), which is required during the initial die opening step. After the movable die part Db has moved by even a relatively short distance, only a relatively low load (smaller force) is required to move the movable die part Db. Therefore, after the initial die opening step, the low-pressure cylinders 55, which may have a diameter smaller than the high-pressure cylinders 51, may be used to move the movable die part Db over a longer distance.

Optionally, operational pressure may be supplied to the low-pressure cylinders 55 at the same time that the high-pressure cylinders 51 are actuated. In this case, the die opening operation using the high-pressure cylinders 51 may smoothly transition to the die opening operation using the low-pressure cylinders 55.

After the cast product has been removed from the die D1 (or D2), a die closing operation is performed. Because the die closing operation only requires a relatively low load (small force), this operation can be performed by retracting only the low-pressure cylinders 55. Thus, the high-pressure cylinders 51 are not required to participant in the die closing operation. Optionally, the clamping operation of the die D1 (or D2) during the die-casting operation may be performed by the die-casting unit 11. Therefore, the low-pressure cylinders 55 will not be required to apply a high-load clamping force (a relatively large clamping force) during the die-casting operation.

As described above, according to the representative die opening/closing apparatus 50, the thrust generated by the high-pressure cylinders 51 may be transmitted to the movable die part Db without changing the direction of the force. Therefore, the die opening/closing apparatus 50 does not require a motion conversion mechanism and may be simplified with regard to the construction for the die opening operation that requires a relatively high pressure. Although the representative die opening/closing apparatus 50 utilize the push pins 52, the push pins 52 preferably do not serve to change the direction of the force. Instead, the push pins 52 preferably serve to directly transmit the thrust generated by the high-pressure cylinders 51 in the extensional (e.g., horizontal) direction. Therefore, the push pins 52 do not constitute "a motion conversion mechanism" according to the present teachings.

Further, the high-pressure cylinders 51 of the representative die opening/closing apparatus 50 preferably are not mounted on the dies D1 and D2. Instead, the high-pressure cylinders 51 may be disposed separately from the dies D1 and D2. Therefore, the high-pressure cylinders 51 may rest at a position outside of the die-casting unit 11 and may operate to perform the die opening operation after the die D1 (or D2) has been carried out of the die-casting unit 11. As a result, the high-pressure cylinder 51 will not project from the dies D1 and D2 and the dies D1 and D2 may have a relatively small size and light weight. Accordingly, the carriage 20 for conveying the die D1 and D2 also may have a relatively small size.

Furthermore, the representative die opening/closing apparatus 50 may horizontally open the dies D1 and D2 in the same direction as the moving direction of the dies D1 and D2. Therefore, the die opening operation can be efficiently performed.

The present invention is not limited to the above representative embodiment but may be suitably changed and modified without departing from the spirit of the invention.

For example, in the above embodiment, the representative die opening/closing apparatus 50 is utilized in the die-casting system 10 that is configured as a die-exchangeable type system. That is, the die-casting operation may be performed by alternately transferring two dies D1 and D2 into and out of the die-casting unit 11. However, the die opening/closing apparatus 50 may also be utilized in a stationary die-casting system, in which the die is assembled within the die-casting unit. In such case, the high-pressure cylinders 51 may be fixedly mounted on a fixed die part of the die.

Further, in the representative embodiment, the carriage rails 31, along which the die carriage 20 moves, are disposed on the ground (i.e., below the die carriage 20). However, the carriage rails 31 may be disposed on a ceiling or overhanging structure. In this case, the die carriage 20 may move along the carriage rails 31 in such a manner that the die carriage 20 is suspended from the carriage rails 31.

Moreover, although the representative die opening/closing apparatus 50 is configured to open the dies D1 and D2 in the horizontal direction, the apparatus 50 may be modified such that the dies D1 and D2 may open in the vertical direction or in another direction.

Furthermore, although the initial opening operation is performed by the high-pressure cylinders 51 via the push pins 52, the high-pressure cylinder 51 may directly push the movable die part Db. In such case, the high-pressure cylinders 51 may be arranged, e.g., to apply the pushing force against the movable die part Db from the outside of the fixed die part Da.

What is claimed is:

1. The die-opening apparatus suitable for opening a die in a die-casting system, comprising:
    a first cylinder performing an initial die opening operation when actuated and being arranged and constructed so that wherein thrust generated by the first cylinder is directly transmitted to the die in a die opening direction during the transmission in order to open the die, the first cylinder having a rest position where the first cylinder is separated from the die; and
    a second cylinder performing a subsequent die opening operation after the initial opening operation.

2. The die-opening apparatus as in claim 1, further comprising:
    a die-casting unit associated with the die for performing a casting operation at a cast position, and
    means for moving the die to and from the cast position.

3. The die-opening apparatus as in claim 1, wherein the die comprises a first die part that is movable in a horizontal direction.

4. The die-opening apparatus as in claim 2, wherein the die is moved away from the die-casting unit at the rest position.

5. The die-opening apparatus as in claim 1, further comprising an assistant member that is slidably moveable relative to the die in order to directly transmit the thrust generated by the first cylinder to the die in the die opening direction.

6. The die-opening apparatus as in claim 5, wherein the assistant member comprises a push pin.

7. The die-opening apparatus as in claim 6, wherein the push pin is movably disposed within the die.

8. The die-opening apparatus as in claim 1, wherein the second cylinder comprises a lowpressure and long-stroke cylinder.

9. The die-opening apparatus as in claim 8, wherein the second cylinder is arranged and constructed to also apply pressure to the die in the die opening direction during at least a portion of the initial die opening operation performed by the first cylinder.

10. The die-opening apparatus as in claim 1, further comprising:
   a die-casting unit associated with the die for performing a casting operation at a cast position,
   means for moving the die to and from the cast position,
   a push pin slidably disposed within a fixed part of the die and directly transmitting the thrust generated by the first cylinder to a movable part of the die in the die opening direction, wherein the die opening direction is the horizontal direction.

11. The die-opening apparatus as in claim 10, wherein the push pin is arranged and constructed so as not to contact the die before the first cylinder is actuated.

12. A die-opening apparatus as in claim 11, wherein the second cylinder comprises a low-pressure and long-stroke cylinder.

13. A die-opening apparatus as in claim 12, wherein the second cylinder is arranged and constructed to also apply pressure to the die in the die opening direction during at least a portion of the initial die opening operation performed by the first cylinder.

14. A method for operating the die-opening apparatus of claim 13 in order to open the die, comprising:
   actuating the first cylinder, thereby performing the initial die opening operation, wherein the thrust generated by the first cylinder is directly transmitted to the die without changing the direction of the force, and
   actuating the second cylinder thereby performing a subsequent die opening operation.

15. A method for operating the die-opening apparatus of claim 1 in order to open the die, comprising:
   actuating the first cylinder of claim 1, thereby performing the initial die opening operation, wherein the thrust force generated by the first cylinder is directly transmitted to the die without changing the direction of the force, and
   actuating the second cylinder thereby performing a subsequent die opening operation.

16. A method for opening a die in a die-casting system, comprising:
   actuating a first cylinder, thereby performing an initial die opening operation, wherein first thrust force generated in a direction by the first cylinder is directly transmitted to the die without changing the original direction of the first force, wherein the first cylinder is separated from the die after the initial opening and
   actuating a second cylinder to generate second thrust froze in the direction for transmitting to the die without changing the original direction of the second thrust force, thereby performing a subsequent die opening operation.

17. A method as in claim 16, wherein the second cylinder is actuated to perform the subsequent die opening operation before the initial die opening operation is completed.

18. A method as in claim 16, wherein the die comprises a first die part that is movable relative to a second die part in order to open the die, and the thrust force generated by the first cylinder is directly transmitted to the first die part.

19. A method as in claim 16, further comprising transmitting the thrust force to the first die part via a push pin that is movably disposed within the die.

20. A method as in claim 19, further comprising normally retaining the push pin so as not to contact the second die part when the first cylinder is not being actuated.

* * * * *